March 20, 1962 C. H. CROW 3,025,921
AUTOMATIC WEIGHING SCALE
Filed Aug. 18, 1958 3 Sheets-Sheet 1

INVENTOR.
CECIL HOLLIS CROW
BY
ATTORNEY.

March 20, 1962  C. H. CROW  3,025,921
AUTOMATIC WEIGHING SCALE
Filed Aug. 18, 1958  3 Sheets-Sheet 2

INVENTOR.
CECIL HOLLIS CROW
BY
ATTORNEY.

March 20, 1962 C. H. CROW 3,025,921
AUTOMATIC WEIGHING SCALE
Filed Aug. 18, 1958 3 Sheets-Sheet 3
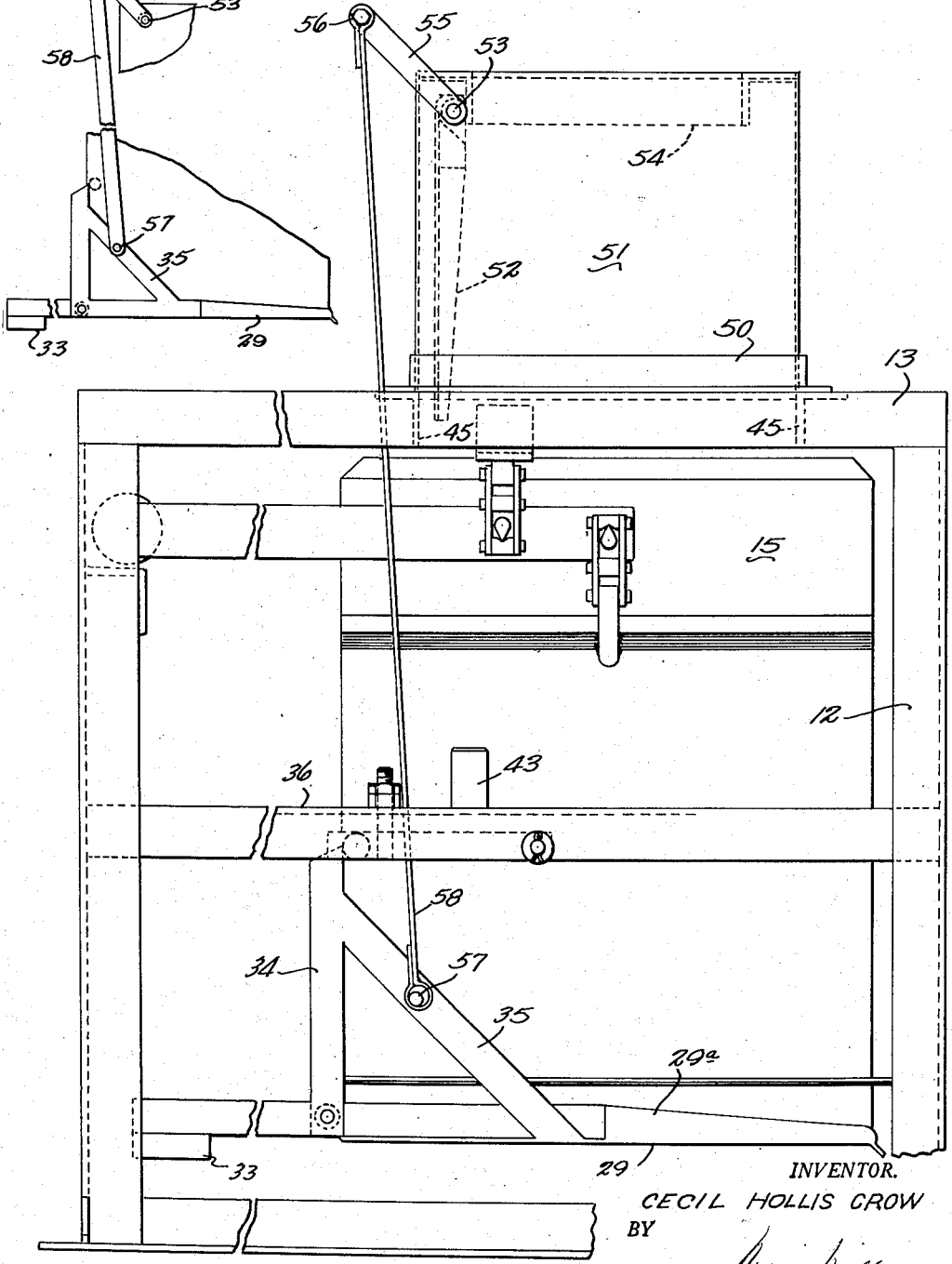
INVENTOR.
CECIL HOLLIS CROW
BY
ATTORNEY.

United States Patent Office

3,025,921
Patented Mar. 20, 1962

3,025,921
AUTOMATIC WEIGHING SCALE
Cecil Hollis Crow, 2115 Colonial Ave., Waco, Tex.
Filed Aug. 18, 1958, Ser. No. 755,730
4 Claims. (Cl. 177—105)

This invention relates to an automatic weighing machine and more particularly to what is known as a "batching" scale in the art. Its purpose is to weigh a predetermined amount of a material at one time, or in a "batch," for delivery to a bag or package or to another machine for further processing.

A primary purpose of the invention is the provision of such a machine which can be made quickly and easily from readily available materials which require a minimum of processing or machining for assembly into the finished product so that it can be sold at an economical and competitive price.

Another object is the provision of such a machine which is extremely simple in design and assembly, which will not easily get out of order and therefore will require a minimum of maintenance.

Further objects and advantages will become apparent from reference to the following specification and drawings in which one embodiment of the invention is described and shown for purposes of illustration.

FIGURES 4, 5, and 6 are plan views of structural details.

FIGURE 7 is a side elevation of an inlet or cut-off gate attachment which may be adapted to the invention.

FIGURE 8 is a front view of an attachment for the machine.

Figure 1:
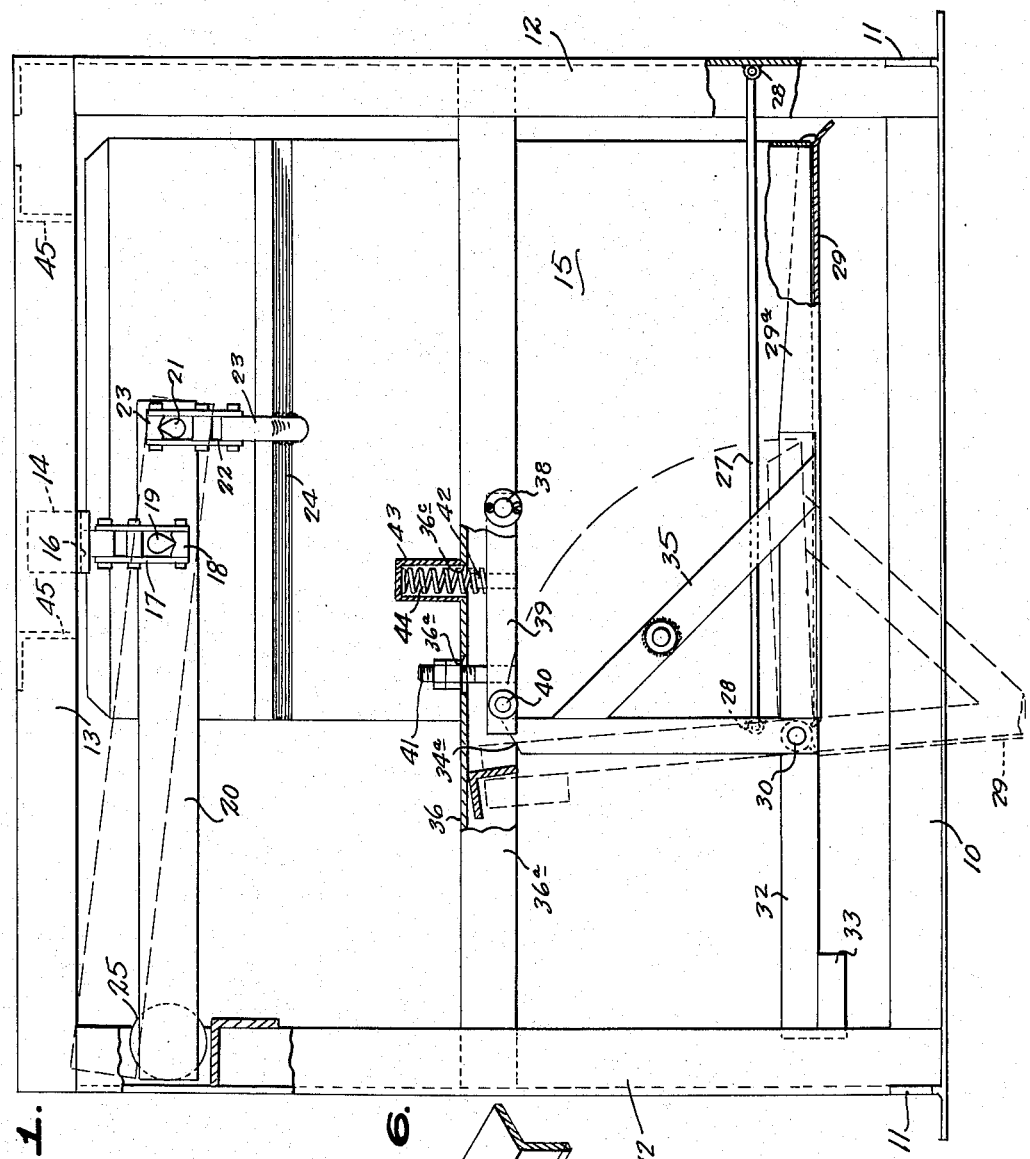
FIGURE 1 is a front elevation of the scale with parts shown in section.
Figure 2:
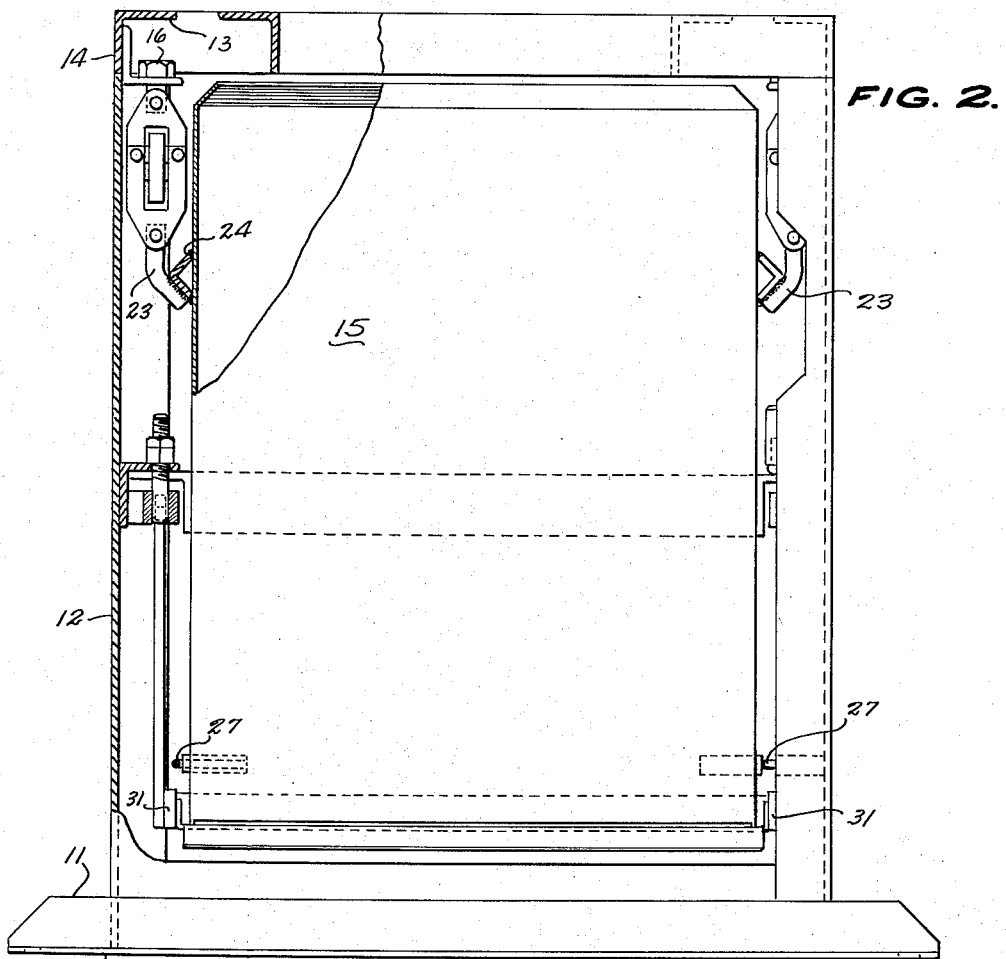
FIGURE 2 is a side elevation thereof with parts shown in section.
Figure 3:
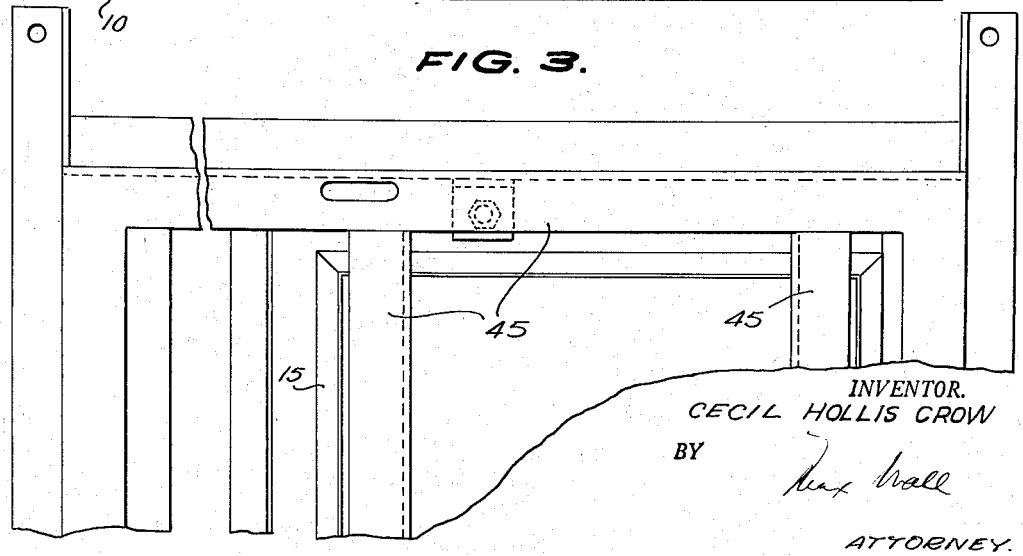
FIGURE 3 is a plan view thereof.

The invention embodies a supporting frame of structural members, such as angle irons, comprising a rectangular base having side members 10 and end members 11. At the corners thereof vertical posts 12 are erected to support a top marginal frame 13 formed of similar transverse and longitudinal structural members suitably secured together and to the posts, as by welding. Just below the marginal frame 13, on opposite sides, a bracket 14 is secured and a weighing hopper 15 is supported from these brackets by pairs of headed pins 16 projecting through the brackets 14, the pins supporting clevis assemblies 17 having bearings 18 for knife edge pivots 19, the knife edges extending downwardly, the pivots being carried by the weighing beams 20 a short distance from one end thereof, one on each side of the hopper, as will be understood by those skilled in the art. Since the weighing assembly on each side of the hopper is the same, a description of one will suffice. The weighing beam 20 carries another knife edge pivot 21 at one end thereof adjacent the first pivot but the knife edge thereof is extended upwardly, in a direction opposite to that of the first pivot. A clevis assembly 22 is supported from this pivot, the assembly having a bearing 23 for the knife edge. This clevis has a downwardly extending bent finger 23 which is secured to a supporting lug 24 fixed to the side of the hopper 15. A counterbalance 25 for the hopper is attached to the free end of the weigh beams 20 and when the hopper is empty, the counterbalance normally rests on a bracket 26 fastened to the supporting frame of the scale. Undue swaying of the hopper is prevented by means of a pair of sway braces 27, one on each side of the hopper, each having its ends turned in opposite directions as clearly shown in FIGURE 4. One end is inserted into a sleeve 28 secured to one wall of the hopper 15, adjacent a corner thereof, the bar 27 being bent around said corner and extending along the adjacent side as best shown in FIGURE 1. The other end of the bar 27 is inserted into a similar sleeve 28 fastened to a corner post 10 remote from the point of attachment of the bar to the hopper. These braces serve to guide and limit the hopper in its movements during and after a charge.

The hopper 15 is open at the top and is closed at its lower end by means of a swinging gate 29 having side flanges 29a, the gate being pivoted at 30 in suitable bearings 31 carried by the hopper. A counterbalance for the gate is provided in the form of a pair of arms 32, one on each side of the hopper, carrying a counterweight 33, these arms being suitably fastened to the gate flanges 29a and extending rearwardly thereof. The gate is controlled by an upwardly extending trip lever 34 (one on each side of the hopper) which is fast to the arm 32 at the pivot point 30 and which is connected to the gate flange 29a by a diagonal brace 35. The upper end of the trip lever is bevelled at 34a as shown in FIGURE 1.

Just above the bevelled end of the trip lever, a horizontal support 36 is provided on each side of the hopper, being suitably permanently secured to the vertical columns 12 of the frame. The support 36 comprises an angle iron having a downwardly extending flange 36a. A bushing or bearing 37 is suitably secured to the flange and supports a pivot pin 38 which carries a trip arm, fast therewith, comprising spaced bars 39, 39a, having a roller 40 suitably supported between them inwardly adjacent their free ends and defining a space to receive the top end of the associated trip lever. Intermediate the roller 40 and pivot 38, the arm carries an upwardly extending machine screw 41, and spaced therefrom, an upwardly extending stud 42. The support 36 has an opening 36b to receive the screw 41, the screw extending through the opening, and having a pair of lock nuts screwed thereon. A similar opening 36c is provided in the support above the stud 42 and the opening is enclosed on the upper side of the support by a socket 43 which houses a coil spring 44 extending downwardly over the pin 42, the spring being under compression between the bottom of the socket and the top of the trip arm, normally urging said arm downwardly, its movement being limited by the nuts on the stop screw 41.

The inlet to the hopper 15 is defined by a marginal frame 45 suitably secured to the scale support frame top 13.

In operation, as a charge of material flows by gravity from a suitable supply source into the hopper, it falls on to the gate 29 and is supported thereon until a predetermined weight of material has entered the hopper sufficient to overbalance the counterweight 25. When this occurs, the weight beams 20 pivot at 19, lifting the counterweight off its support 26, allowing the hopper 15 to move downwardly. This downward motion allows trip lever 34, which is carried by the hopper to become disengaged from roller 40 (which is stationary with respect to the hopper) on the downward movement of the latter. As the trip lever moves past the roller, the gate 29 swings open about pivot 30, opening the bottom of the hopper and allowing the material therein to flow out by gravity.

As soon as the gate is opened, some of the material flows out of the hopper, thus reducing the weight therein and allowing the counterweight 25 to overbalance the hopper and return to its position of rest on the bracket 26. The gate 29 meanwhile has fully opened and dischargd its load, and under the influence of its own counterweight 33, returns to the closed position, causing the bevelled edge 34a of trip lever 34 to strike roller 40, pushing it upwardly against the force of the spring 44, allowing the lever to move to its original position as shown in FIGURE 1. As soon as the roller passes over the edge of the trip lever, the spring 44 urges the trip arm 39 downwardly until it reaches the downward limit of its travel caused by nuts on stop screw 41, whereupon the roller latches behind the roller 40 as shown in FIGURE 1 and blocks its movement to lock the gate 29.

This form of arrangement is satisfactory where the flow of material into the hopper is uniform or where extreme accuracy of weight is not required. For operation where the flow of material is not uniform or where greater accuracy is required, a cut-off gate is placed above the hopper inlet as shown in FIGURE 7, this gate being constructed and arranged so as to be controlled by the opening and closing of the gate 29.

The cut-off gate comprises a rectangular frame 50 of a size coinciding with the hopper inlet frame 45. This frame supports a tubular housing or chute 51, the upper end of which carries a gate 52 pivoted at 53 to close the opening 54 formed at the upper end of the chute. The pivot bar 53, to which the gate is attached, carries fixed thereto an outwardly extending lever 55. This lever carries a stud 56 adjacent its free end. A similar stud 57 is fixed to the diagonal brace 35 of the lower gate 29. The two studs are connected by a link or cable 58 so that when the hopper gate 29 opens, the link closes the inlet gate 52, thus preventing further entrance of material into the hopper until the latter is closed, which thereupon causes opening of the inlet gate. The link is slotted at its upper end as shown at 59 to allow for the slight lost motion in the downward movement of the hopper under load. The slot 59 will permit such movement without affecting the gate 52, and this gate will not be operated by the movement of the hopper during the weighing period but only by movement of the gate 29. Thus, the accuracy of the weighing is preserved as the weight is first determined by the lever system, the balancing action of the weigh beams releases the hopper gate, and the motion of the hopper gate closes the cut-off or inlet gate.

While the foregoing describes a preferred embodiment of the invention, changes in design, construction and arrangement of parts may be made without departing from the spirit of the invention as defined by the appended claims.

I claim:

1. A batching scale comprising a frame, a weigh beam pivotally supported on said frame, a hopper pivotally supported on one end of said weigh beam, a pivoted gate at the bottom of said hopper, an upstanding trip lever secured to said gate, a pair of spaced bars pivoted to said frame, a roller mounted between the free end portions of the bars, means limiting downward rotation of said bars, said trip lever being receivable between said bars and being lockingly engageable with said roller, the downward movement of the hopper under load being sufficient to disengage said trip lever from said roller to release and open said gate and discharge the load, and means to bias said gate toward a closed position and to bias said trip lever toward an upstanding position to engage between said bars and lockingly engage said roller.

2. The structure of claim 1, and spring means urging said spaced bars downwardly toward their limiting positions.

3. The structure of claim 1, and wherein the top end of said trip lever is bevelled downwardly and outwardly with respect to said roller.

4. The structure of claim 1, and a chute mounted above the hopper, a gate pivoted thereon to open and close the chute, means to open said last-named gate when the hopper gate is closed, and means to close said last-named gate when the hopper gate opens.

References Cited in the file of this patent

UNITED STATES PATENTS

| | | |
|---|---|---|
| 1,152,868 | Zanone | Sept. 7, 1915 |
| 1,224,289 | Edtbauer | May 1, 1917 |
| 2,294,551 | Guest | Sept. 1, 1942 |

FOREIGN PATENTS

| | | |
|---|---|---|
| 263,676 | Germany | Aug. 29, 1913 |